Sept. 6, 1960    M. H. SCHEITER    2,951,694
GOVERNOR DRIVE FOR HYDRAULIC TRANSMISSION
Filed Aug. 24, 1955    2 Sheets-Sheet 2

INVENTOR.
Milton H. Scheiter
BY
W. C. Middleton
ATTORNEY

United States Patent Office 2,951,694
Patented Sept. 6, 1960

2,951,694

GOVERNOR DRIVE FOR HYDRAULIC TRANSMISSION

Milton H. Scheiter, Dearborn, Mich., assignor to General Motors Corporation, Detroit, Mich., a corporation of Delaware Filed Aug. 24, 1955, Ser. No. 530,319

2 Claims. (Cl. 73—521)

This invention relates to governor drives and more particularly to drives for governors used in connection with hydraulically controlled automatic transmissions.

In the operation of automatically controlled hydraulic transmissions it is quite customary to utilize a hydraulic governor or metering valve which operates to regulate hydraulic pressure in accordance with the speed of rotation of a particular part of the transmission such as, for example, the output shaft thereof. Such governors therefore provide hydraulic pressure which is indicative of vehicle speed and which is utilized for various purposes, such as the operation of shift valves for changing the speed ratio in the transmission. Governors driven by an output shaft or by any other part of the mechanism have been driven in various fashions heretofore, for example by a separate gear drive from the output shaft.

An object of the present invention is to provide a simplified type of drive for a hydraulic governor of the type utilized in automatically controlled hydraulically operated transmissions.

Another object of the invention is to provide a drive for a governor of the foregoing type so that the governor is driven by the output shaft without requiring the use of separate gearing or the like therefor.

Another object of the invention is to provide a governor drive that is coordinated with a liquid supply pump that in turn is driven by the shaft the speed of which is to be the controlling factor in the regulated pressure delivered by the governor.

Another object of the invention is to provide a governor drive in association with a gear type pump wherein the governor is driven by the driven gear of the pump, being mounted coaxial therewith, and having a connection with the gear for rotating the governor in unison with the driven gear of the pump.

A still further object of the invention is to provide a drive as before described of such character that the governor can be journalled for rotation in an enlargement or boss provided in the pump cover, which enlargement has the bore thereof coaxial with the axis of rotation of the driven gear of the pump.

A still further object of the invention is to provide an arrangement whereby the governor can be restrained against such longitudinal movement as would cause misalignment of liquid ports in the governor body and in the housing in which the governor is journalled.

In carrying out the foregoing and other objects of the invention, a hydraulic governor is so associated with a gear pump as to be driven by the driven gear of this pump. In actual practice the driving gear of the gear pump may be splined to a suitable shaft such as the output shaft of a transmission and the driving gear has meshing therewith a driven gear. The two gears are enclosed in a pump housing and a pump cover and the cover is provided with a boss or enlargement having a bore therein axially aligned with the axis of rotation of the driven gear. The governor has a body portion which can rotate in the bore provided in the pump cover boss, and has other parts thereof extending diametrically relative to the axis of the rotatable part and having contained therein one or more hydraulic regulating valves. Drive from the driven gear of the pump to the governor body is imparted by a connecting member of any desired configuration, which connecting member can have one or more formations engaging the gear and another formation mated in a suitable recess or the like in the rotatable valve body. Longitudinal movement of the governor can be prevented in one direction by the proximity of the end of a rotatable body to the pump driven gear and in the other direction by a suitable boss or formation on the interior of the casing in which the transmission is enclosed. As is common in devices of this character, suitable ports are provided in the pump cover boss which will register with the ported grooves in the rotatable governor body. These grooves can be in communication through the governor body with various parts of the regulating valves so that liquid, such as oil, which may be supplied by the associated pump can be fed to the governor, the pressure thereof regulated by one or more regulating valves of the governor, and this regulated pressure delivered to parts of the transmission mechanism to be effected by the regulated pressure.

Other features, objects and advantages of the invention will become apparent by reference to the following detailed description of the accompanying drawings wherein Figure 1 is a side elevation of parts of an engine, transmission housing, and a vertical section through such part of the housing as is germane to the present invention;

Figure 1:
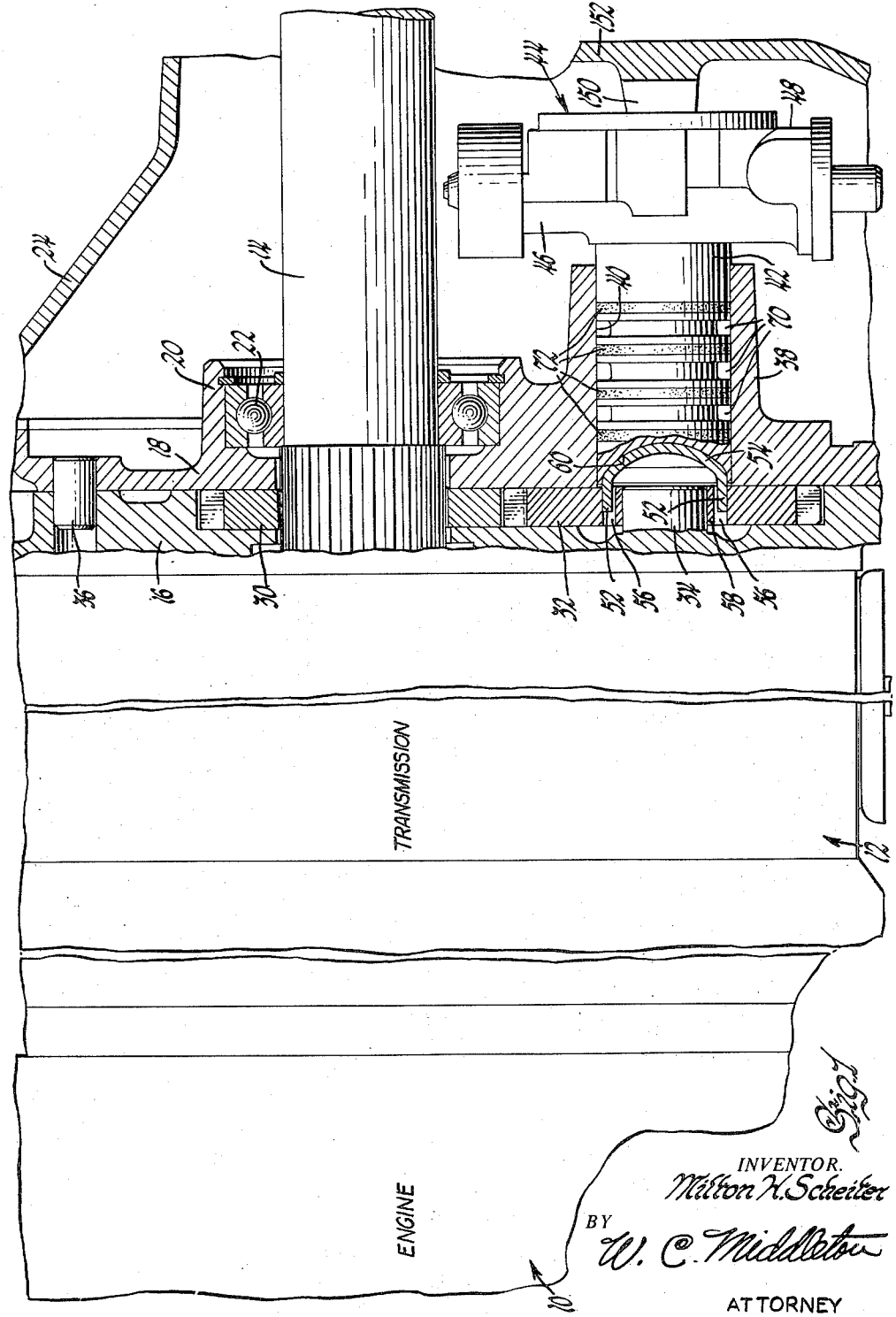

Referring to the drawings, and particularly to Figure 1, 10 indicates diagrammatically a source of motive power, such as an internal combustion engine, for driving an automotive vehicle. In line with the engine 10 is a transmission 12 which may be of any well known type but which for purposes of explanation of this invention can be of the type shown and described in the copending application of August H. Borman, Jr., et al., Serial No. 477,832 filed December 27, 1954 for Controlled Coupling Automatic Transmissions. This transmission has an output shaft indicated at 14 which passes through a pump housing 16 and a pump cover 18 therefor, being journalled in an enlargement 20 of the cover by anti-friction ball bearings 22. The pump housing may be secured in any well known fashion to the transmission casing 24, parts of which are shown in sections.

The pump housing 16 is so shaped and recessed as to accommodate a pump driving gear 30 splined to the output shaft 14 and a pump driven gear 32 meshing with the driving gear 30 and rotatably mounted on a stud 34 formed integrally with the pump housing. The pump cover 18 may be secured to the housing 16 in any well known manner and is properly registered with the housing by dowels 36. In addition to the enlargement 20 the pump cover has a boss 38 provided with a through bore 40 which is coaxial with the stud 34.

The bore 40 is dimensioned to receive a rotating body part 42 of the governor indicated generally at 44, which governor may be of the type illustrated and described in the aforesaid Borman, Jr., et al. application. In addition to the body part 42 the governor 44 has radially extending portions 46 and 48 in which are mounted regulating or metering valves for determining the pressure of liquid delivered by the governor, which pressure varies with change in speed of rotation of the governor.

Figure 2:
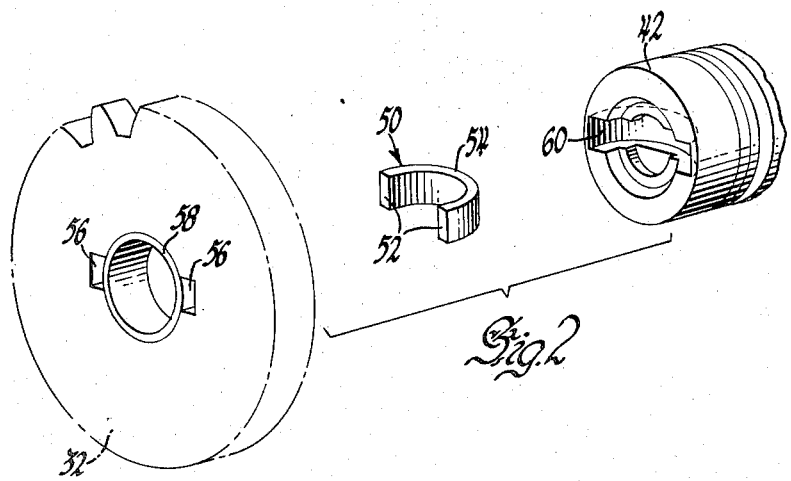
Figure 2 is a collective view of parts involved in this invention.

Rotation of the governor 44 is obtained by the use of a connecting member indicated generally at 50 in Figure 2 which connecting member is of modified U-shape having legs 52 and an arcuate shaped portion 54. Referring particularly to Figure 2, the relation of the parts will be better understood. The driven gear 32 of the pump has diametrically opposed recesses 56 and is provided with a bushing 58 press fit into the center opening of the gear. Bushing 58 serves as a bearing for the gear 32 for rotation about the stud 34. The body 42 of the governor has an arc-shaped recess 60 cut in the end thereof, the recess being shaped to receive the part 54 of the connecting member 50. This connecting member therefore can have the legs 52 thereof inserted into the recesses 56 and the arcuate shape part 54 mated in the groove 60 of the governor body 42. Under these conditions rotation of the driven gear 32 will cause concurrent rotation of the governor 44 about an axis coincident with the axis of rotation of the driven gear 32.

As before mentioned the governor 44 is of the type disclosed in the previously identified application with the body 42 thereof being provided with spaced grooves 70 and additional spaced grooves in which are mounted expansible sealing rings 72. These rings serve to prevent leakage between the respective grooves 70. The grooves 70 are for the purpose of alignment with ports in the boss 38 (the ports not being shown) and the body 42 of the governor has radial ports in the bases of the grooves 70 (not shown) which ports can connect with internal channels in the body 42 leading to the radial extensions 46 and 48. Inasmuch as the exact construction of the governor forms no part of this invention detailed illustration thereof has been omitted but the operation of the governor can be understood by reference to the schematic circuit diagram shown in Figure 3.

Figure 3:
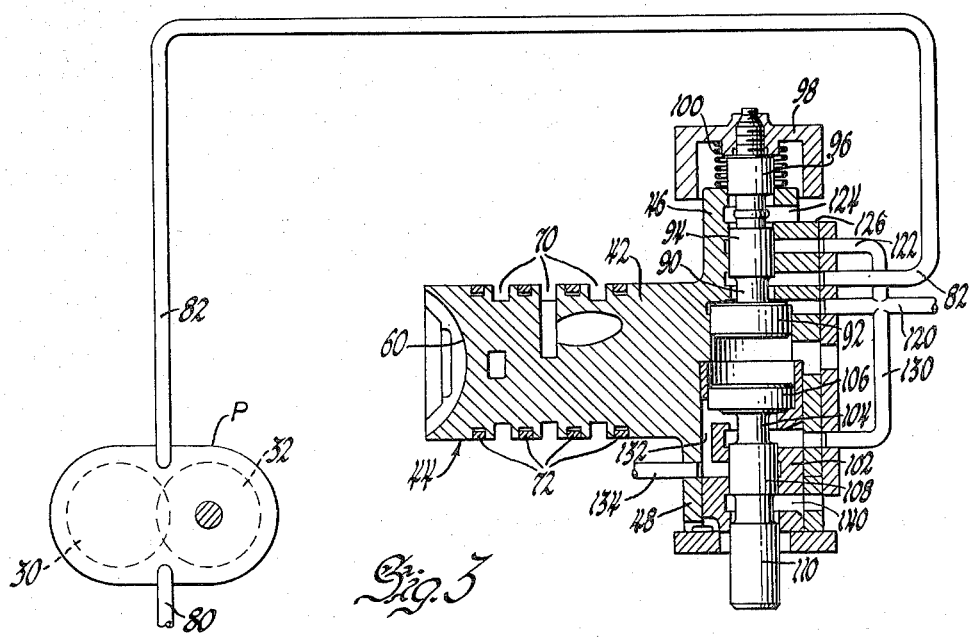
Figure 3 is a hydraulic circuit diagram of the pump and governor.

In Figure 3 the pump P made up of the gears 30 and 32 is shown as having an intake or suction line 80 and a discharge line 82. The discharge line 82 is extended to a port in the radial extension 46 which communicates with the bore in such extension 46 in which governor valve member 90 is radially slidably mounted. The valve 90 has a large land 92 and spaced smaller lands 94 and 96. Secured to the end of the valve 90 is a weight 98 biased radially outwardly by spring 100. The radial part 48 has a bore therein in which is contained a liner 102 in turn provided with a bore for the reception of a radially slidable valve 104 having a large land 106 and spaced smaller lands 108 and 110.

Oil delivered by the pump P, or from any other source, through the line 82 enters the bore of the radial portion 46 of the governor and if the governor is rotating, the valve 90 is moved outwardly by centrifugal force causing land 94 to assume the position shown in the drawing so that oil can enter the bore between lands 94 and 92 and continue outwardly through the port connected to line 120. As the pressure of oil delivered in line 120 increases due to reaction in some part of the transmission, this increase in pressure is reflected on the land 92 which is of larger diameter than land 94. Such build up of pressure moves the valve 90 inwardly against centrifugal force so that the land 94 will close the port connected to line 82, and keep this port closed so long as the pressure in line 120 balances centrifugal force exerted on the valve 90. If centrifugal force increases valve 90 is moved outwardly allowing more oil from line 82 to continue to line 120 until the balance is again attained. If centrifugal force decreases, due to lower speed of rotation of the governor, the pressure in line 120, reflected on land 92 can move valve 90 inwardly sufficiently for land 94 to open a port connected to line 122, from line 120, to exhaust at 124, allowing the exhaust of such quantity of oil as is necessary to restore the balance between delivered pressure and centrifugal force. The exhaust port is then closed and further movement of valve 90 is only that required to supply oil to, or exhaust oil from line 120, so that the pressure in line 120 at any particular speed of governor rotation is substantially constant. This regulating action continues throughout the operation of the governor with the valve 90 capable of movement between the illustrated position and an inward position in which the skirt of the weight 98 contacts a shoulder 126 of the part 46.

If the governor is stationary, for example, during times that the output shaft 14 is not rotating, and oil is being supplied to the supply line 82 from a source (not illustrated) other than pump P, the valve 90 will still deliver a regulated pressure to the line 120 due to the spring 100. This delivered pressure will be of a fairly low order since the spring 100 does not apply a force of any great magnitude. In actual practice the spring 100 may be calibrated to cause the delivery of a pressure in line 120 of the order of 5 p.s.i. It will be noted that centrifugal force being absent when the governor is at rest, the spring 100 acts as a low order substitute therefor.

The action of the valve 104 is similar to that of valve 90 with the exception that instead of being supplied with oil directly from pump P this valve is supplied with oil through the branch line 130 from line 120. With the governor rotating the valve 104 is moved outwardly by centrifugal force causing land 108 to open the port connected to line 130 so that oil can continue from the bore of valve 104 through the passage 132 to the outlet 134. As the pressure in the outlet 134 increases its effect is felt on the large land 106, moving this valve 104 inwardly against centrifugal force until land 108 closes the port connected to supply line 130. The action of valve 104 is the same as that of valve 90, regulating delivered pressure in line 134. Any required exhaust of oil for this regulating action is by way of exhaust port 140. The pressure delivered by the valve 104 rises at a different rate from that delivered by the valve 90 and line 120 since centrifugal force on valve 104 is not as great as that on valve 90, the latter having the added mass of the weight 98.

The governor can be assembled with the pump in any desired sequence of operation, preferably after the pump cover 18 has been secured to the pump body 16. The portion 54 of connecting member 50 can be mated in the recess 60 and the governor body part 42 introduced into the bore 40 of the boss 38. The legs 52 of the connecting member 50 can be brought into register with the recesses 56 of the driven gear and the governor moved toward the driven gear to the full permissible extent. Once in the position shown in Figure 1, undesired axial motion of the governor can be prevented by a boss 150 extending from a part of the transmission casing 152 which will be attached after the governor has been installed.

The present arrangement, as will be evident, provides a novel drive for a hydraulic governor or metering valve which governor due to this drive rotates at substantially the same rate as the part of the transmission, the speed of which the governor is to reflect by changes in delivered pressures. This present arrangement obviates the necessity of separate gearing between a rotating shaft, such as the output shaft 14, and the governor and reduces the parts necessary for functioning thereof to the absolute minimum.

It is to be understood that modifications beyond the illustrated embodiment may be made and that any limitations imposed on the invention are to be only those set forth in the following claims.

What is claimed is:

1. The combination of a fluid pump having a casing and a cover, both said casing and said cover having confronting gear sealing faces substantially parallel aligned, a rotatable shaft passing therethrough and arranged to interconnect an input and an output, a driving gear on said shaft, a stub shaft formed integral with said casing, said stub shaft having the axis thereof arranged substantially perpendicular to said casing face, a driven gear journalled on said stub shaft, both of said gears engaging said casing and cover faces, said cover having an elongated through bore, a governor body mounted for rotation in said bore coaxially with said driven gear, said driven gear having opposite recesses in close proximity to said boss, one end of said governor body having an arcuate shaped recess therein, and a substantially U-shaped connecting member engaging said driven gear and governor body recesses for causing rotation of said governor body with said driven gear, said connecting member being shiftable relative to said driven gear and governor body recesses so as to compensate for misalignments between said driven gear and said governor body.

2. The combination of a fluid pump having a casing and a cover, both said casing and said cover having confronting gear sealing faces substantially parallel aligned, a rotatable shaft passing therethrough and arranged to interconnect an input and an output, a driving gear on said shaft, a stub shaft formed integral with said casing, said stub shaft having the axis thereof arranged substantially perpendicular to said casing face, a driven gear journalled on said stub shaft, both of said gears engaging said casing and cover faces, said cover having an elongated through bore, a governor body mounted for rotation in said bore coaxially with said driven gear, said driven gear having opposite recesses in close proximity to said boss, one end of said governor body having an arcuate shaped recess therein, and a substantially U-shaped connecting member engaging said driven gear and governor body recesses for causing rotation of said governor body with said driven gear, said connecting member being shiftable relative to said driven gear and governor body recesses so as to compensate for axial misalignments between said driven gear and said governor body, and a stationary formation adjacent to the other end of said governor body for limiting axial movement thereof.

References Cited in the file of this patent

UNITED STATES PATENTS

| | | |
|---|---|---|
| 1,384,283 | Vincent | July 12, 1921 |
| 2,148,975 | Agren | Feb. 28, 1939 |
| 2,451,342 | Kent | Oct. 12, 1948 |
| 2,460,091 | Krause | Jan. 25, 1949 |
| 2,467,445 | Schwendner | Apr. 19, 1949 |
| 2,493,402 | Hahn | Jan. 3, 1950 |
| 2,594,866 | Burritt | Apr. 29, 1952 |
| 2,697,363 | Sheppard | Dec. 21, 1954 |
| 2,722,205 | Lautzenhiser | Nov. 1, 1955 |

FOREIGN PATENTS

| | | |
|---|---|---|
| 152,328 | Germany | June 22, 1904 |